United States Patent [19]
Mori et al.

[11] Patent Number: 5,929,989
[45] Date of Patent: Jul. 27, 1999

[54] OPTICAL PRESSURE DETECTION METHOD AND APPARATUS

[75] Inventors: Sadao Mori, Tsuchiura; Toshio Akatsu, Ushiku; Tokio Yamagiwa, Hitachi, all of Japan

[73] Assignee: Hitachi, Ltd., Tokyo, Japan

[21] Appl. No.: 08/639,520

[22] Filed: May 1, 1996

[30] Foreign Application Priority Data

May 2, 1995 [JP] Japan .................................. 7-108774

[51] Int. Cl.$^6$ .................................................. G41B 9/02
[52] U.S. Cl. .................. 356/345; 356/35.5; 356/349; 356/351; 356/361; 359/129; 359/130
[58] Field of Search .................................... 356/345, 355, 356/358, 349, 351, 361; 359/129, 130, 131, 126, 124, 125

[56] References Cited

U.S. PATENT DOCUMENTS

| | | | |
|---|---|---|---|
| 5,301,001 | 4/1994 | Murphy et al. ........................ | 356/345 |
| 5,483,343 | 1/1996 | Iwamoto et al. ........................ | 356/361 |
| 5,491,550 | 2/1996 | Dabbs ..................................... | 356/345 |
| 5,648,848 | 7/1997 | Aiyer et al. ............................. | 356/351 |

*Primary Examiner*—Robert H. Kim
*Attorney, Agent, or Firm*—Antonelli, Terry, Stout & Kraus, LLP

[57] ABSTRACT

Light from a light source is fed to a sensing probe through a polarization plane-reserving fiber, and is split into two light beams, that is, a reference beam and a measurement beam. The reference beam is passed through a reference medium, and the measurement beam is passed through a pressure-sensitive medium, which may be in the form of gas. Then, the reference beam and the measurement beam are fed to a light-receiving portion via the polarization plane-reserving fiber, and are converted into electrical signals. The electrical signals are inputted into a signal processing portion, and the optical path length difference between the reference and measurement beams, passed through their respective mediums, is determined, and the pressure of the pressure-sensitive medium is detected from this optical path length difference.

8 Claims, 8 Drawing Sheets

OPTICAL PRESSURE DETECTION METHOD AND APPARATUS

BACKGROUND OF THE INVENTION

This invention relates generally to optical pressure detection for detecting the pressure of a fluid, and more particularly to an explosion-proof sensor required in a chemical plant or the like, an optical pressure detection method and an optical pressure sensor which are suited for measuring a fluid pressure in an environment in which high voltage and large current, as produced by a thunderbolt (lightening), develop, a wavelength plate, a polarization selection device and a light distributor used in such an optical pressure sensor, a multipoint-measuring optical sensor system utilizing such a method, and a sensing probe used therein.

RELATED ART OF THE INVENTION

In a chemical plant or the like, a pressure sensor is usually used for detecting the pressure of gas and a liquid. There is already known one such pressure sensor of the electrical type having an explosion-proof construction satisfying, for example, explosion-proof requirements of JISC0903. Another known conventional technique is disclosed in "Optical Integrated Circuit" (page 371; published in 1985 by Ohm Corporation (Japan)). The pressure sensor disclosed in this publication utilizes light, and does not require any particular explosion-proof construction because of its detection principle.

The former of the above two sensors is the electrical sensor, and therefore this sensor, when to be used in a chemical plant, must be of the explosion-proof type. And besides, this sensor, when to be used in an environment in which high voltage and large current occur, must have a special construction for dealing with such bad environment involving high voltage and noises, that is, must has an environmental resistance.

On the other hand, the latter sensor utilizes light, and does not need to have any special construction for explosion-proof and environment-resistant purposes. In this sensor utilizing light, part of a cladding layer of a fiber is removed, and a diaphragm, coated with aluminum or the like, is opposed to this fiber, with a very small gap (corresponding to a wavelength of light) defined therebetween, thereby providing a sensing probe. When this diaphragm is bent upon application of a pressure thereon, a propagation loss develops in the sensing probe, and this propagation loss is utilized for detection purposes.

However, in the above conventional techniques, and particularly in the manufacture of the latter pressure sensor utilizing light, it is difficult to stably provide the minute gap between the diaphragm and the fiber, which has led to a problem that this sensor is not satisfactory in reliability. This conventional optical sensor has another problem that it is liable to be affected or influenced by a variation (or fluctuation) in the amount of light of a light source and a variation in light loss in an optical path.

SUMMARY OF THE INVENTION

With the above problems of the conventional techniques, it is a first object of this invention to provide an optical pressure sensor which can be used in a chemical plant or the like without the need for any special explosion-proof construction, and can be easily manufactured, and is highly reliable, an optical pressure detection method which is highly reliable, and a multipoint-measuring optical pressure sensor system utilizing such a method.

A second object of the invention is to provide an optical pressure sensor and a multipoint-measuring optical pressure sensor system which can be handled easily.

A third object of the invention is to provide a multipoint-measuring optical pressure sensor system which can detect pressures at a plurality of points by one signal processing portion.

A fourth object of the invention is to provide an optical pressure sensor which has a wide measuring range.

A fifth object of the invention is to provide an optical pressure sensor which is less liable to be influenced by a variation (or fluctuation) in the amount of light of a light source and a variation in light loss in an optical path.

Another object of the present invention is to provide an optical pressure sensor which is less susceptible to variation in the ambient temperature.

A further object is to provide a wavelength plate, a polarization selection device, a light distributor suitably used in such an optical pressure detection method and such an optical pressure sensor, as well as a sensing probe suitably used in such a multipoint-measuring optical pressure sensor system.

According to a first aspect of the present invention, there is provided an optical pressure detection method comprising the steps of:

splitting light from a light source into at least two beams respectively defining a reference beam and a measurement beam;

passing the reference beam through a reference medium while passing the measurement beam through a pressure-sensitive medium which varies in refractive index in accordance with a pressure;

determining the difference between a length of an optical path of the reference beam and a length of an optical path of the measurement beam after the reference and measurement beams pass through their respective mediums; and detecting the pressure of the pressure-sensitive medium in accordance with the optical path length difference.

According to a second aspect of the invention, there is provided an optical pressure sensor comprising:

a light source;

means for splitting light from the light source into at least two light beams to form a reference beam and a measurement beam;

means having a reference medium sealed therein for forming an optical path therein along which the reference beam passes;

means for forming an optical path along which the measurement beam passes through a pressure-sensitive medium to be detected which varies in refractive index in accordance with a pressure;

means for detecting the difference between a length of the optical path of the reference beam and a length of the optical path of the measurement beam after the reference and measurement beams pass respectively through the reference medium and the pressure-sensitive medium; and signal processing means for computing the pressure of the pressure-sensitive medium in accordance with the optical path length difference between the reference beam and the measurement beam.

According to a third aspect of the invention, there is provided an optical pressure sensor comprising:

a light source;

a signal processing portion;

a sensing probe;

a first fiber connecting the light source to the sensing probe; and a second fiber connecting the sensing probe to the signal processing portion;

wherein the sensing probe comprises beam splitting means for splitting light from the light source into two beams respectively defining a measurement beam and a reference beam, a wavelength plate inserted in one of optical paths of the reference beam and the measurement beam, a first mirror for reflecting the reference beam, a second mirror for reflecting the measurement beam, a reference optical path member provided in the optical path of the reference beam, and a pressure-sensitive medium which varies in refractive index in accordance with a pressure present in the optical path of the measurement beam;

wherein the first fiber is a polarization plane-reserving fiber which propagates the light from the light source as two light beams whose polarization planes are different by 90 degrees from each other;

wherein the first fiber also serves as the second fiber; and wherein the signal processing portion comprises polarization splitting means for splitting the outgoing light (return light from the sensing probe) from the polarization plane-reserving fiber in terms of polarization into two beams, signal processing circuits for determining the difference between a length of the optical path of the measurement beam and a length of the optical path of the reference beam from the outgoing light from the polarization splitting means, and an adder circuit for adding outputs of the signal processing circuits together.

According to a fourth aspect of the invention, there is provided an optical pressure sensor comprising:

a light source;

a signal processing portion;

a sensing probe;

a first fiber connecting the light source to the sensing probe; and a second fiber connecting the sensing probe to the signal processing portion;

wherein the sensing probe comprises beam splitting means for splitting light from the light source into two beams respectively defining a measurement beam and a reference beam, a wavelength plate inserted in one of optical paths of the reference beam and the measurement beam, a first mirror for reflecting the reference beam, a second mirror for reflecting the measurement beam, a reference optical path member provided in the optical path of the reference beam, a pressure-sensitive medium which varies in refractive index in accordance with a pressure present in the optical path of the measurement beam, and polarization splitting means for splitting the reflected light of each of the measurement beam and the reference beam in terms of polarization into two beams;

wherein the first fiber is a polarization plane-reserving fiber which propagates the light. from the light source as two light beams whose polarization planes are different by 90 degrees from each other;

wherein the second fiber comprises two fibers for respectively feeding the two kinds of outgoing beams from the polarization splitting means to signal processing circuits which determine the difference between a length of the optical path of the measurement beam and a length of the optical path of the reference beam; and wherein the signal processing portion comprises an addition circuit for adding outputs of the signal processing circuits together.

According to a fifth aspect of the invention, there is provided an optical pressure sensor comprising:

a light source;

a signal processing portion;

a sensing probe;

a first fiber connecting the light source to the sensing probe; and a second fiber connecting the sensing probe to the signal processing portion;

wherein the sensing probe comprises beam splitting means for splitting light from the light source into two beams, polarization beam splitting and combining means for splitting the light in terms of polarization into a measurement beam and a reference beam and for again combining the beams together, a reference optical path member provided in the optical path of the reference beam, and a pressure-sensitive medium which varies in refractive index in accordance with a pressure present in the optical path of the measurement beam;

wherein the first fiber is a polarization plane-reserving fiber which propagates the light from the light source in the form of two light beams whose polarization planes are different by 90 degrees from each other;

wherein the second fiber comprises two fibers for respectively feeding the output of the polarization beam splitting and combining means and the output of the beam splitting means to signal processing circuits which determine the optical path length difference between the light beams of one polarization and the optical path length difference of the light beams of another polarization; and wherein the signal processing portion comprises a subtracting circuit for subtracting outputs of the signal processing circuits from each other.

According to a sixth aspect of the invention, there is provided an optical pressure sensor comprising:

a light source;

a signal processing portion;

a sensing probe;

a first fiber connecting the light source to the sensing probe; and a second fiber connecting the sensing probe to the signal processing portion;

wherein the sensing probe comprises beam splitting means for splitting light from the light source into a measurement beam and a reference beam, polarization selecting and rotating means inserted in each of optical paths of the reference beam and the measurement beam for selecting a polarization, a mirror provided rearward of the polarization selecting and rotating means, and a pressure-sensitive medium which varies in refractive index in accordance with a pressure present in the optical path of the measurement beam;

wherein the first fiber is a polarization plane-reserving fiber which propagates the light from the light source in the form of two light beams whose polarization planes are different by 90 degrees from each other;

wherein the first fiber also serves as the second fiber;

wherein the polarization selecting and rotating means, inserted in the optical path of the reference beam, transmits only one of the two differently-polarized light beams propagated through the first fiber, and functions to rotate its polarization plane 90 degrees, whereas the polarization selecting and rotating means, inserted in the optical path of the measurement beam, transmits the other of the two differently-polarized light beams propagated through the first fiber, which is other than that selected by polarizing means inserted in the reference beam optical path, and functions to rotate its polarization plane by 90 degrees; and wherein the signal processing portion comprises polarizing and splitting means for splitting the outgoing light (return light from the sensing probe) from the polarization plane-reserving fiber in terms of polarization into two beams, and signal processing circuits for determining the optical path length difference between the measurement beam and the reference beam from the outgoing light from the polarizing and splitting means.

According to a seventh aspect of the invention, there is provided a multipoint-measuring optical pressure sensor system using an optical pressure detection method wherein light from a light source is split into at least two light beams respectively defining a reference beam and a measurement beam; the reference beam is passed through a reference medium whereas the measurement beam is passed through a pressure-sensitive medium which varies in refractive index in accordance with a pressure; the difference between a length of an optical path of the reference beam and a length of an optical path of the measurement beam after the reference and measurement beams pass through their respective mediums is determined; the pressure of the pressure-sensitive medium is detected from the optical path length difference; the pressures of the pressure-sensitive medium, in a plurality of detection portions remote from the light source, are detected;

the multipoint-measuring optical pressure sensor system comprising:

light distributing means for distributing the light from the light source among the plurality of detection portions;

an optical fiber network for feeding the distributed light beams from the light distributing means respectively to the plurality of detection portions;

sensing probes provided respectively in the plurality of remote detection portions, wherein in each of the sensing probes, the light, fed thereto via the light distributing means and the optical fiber network, is split into at least two beams to thereby provide the reference beam and the measurement beam, and the reference beam is passed through the reference medium while the measurement beam is passed through the pressure-sensitive medium;

light-receiving portion for receiving the reference beams and measurement beams from the plurality of sensing probes and for detecting the light of the reference and measurement beams passed through their respective mediums; and a signal processing portion for calculating the pressure of the pressure-sensitive medium in each of the plurality of detection portions in accordance with the optical path length difference between the reference and measurement beam detected in the light-receiving portion.

According to an eighth aspect of the invention, there is provided a wavelength plate for use in the above optical pressure sensor, in which the wavelength plate is inserted in one of the reference beam optical path and the measurement beam optical path, and comprises a ¼ wavelength plate corresponding to a first wavelength, a wavelength selection reflecting film which reflects light of the first wavelength but transmits light of a second wavelength, a compensation wavelength plate for producing only an error amount in phase difference between a F-axis component and a S-axis component of the incident light produced in the first wavelength plate for the second wavelength light, and a reflecting film, the ¼ wavelength plate, the wavelength selection reflecting film, the compensation wavelength plate and the reflecting film being bonded together.

According to a ninth aspect of the invention, there is provided a polarization selecting and rotating device for use in the above optical pressure sensor, in which the polarization selecting and rotating device is inserted in each of the optical paths of the reference beam and the measurement beam for selecting a polarization plane thereof, and comprises first polarization rotating means for rotating a polarization plane of the incident light of a first wavelength through 45 degrees, wavelength selecting means which reflects the light of the first wavelength but transmits light of a second wavelength, first polarization selecting means for selecting the polarization of the reflected light from the wavelength selecting means, a mirror provided rearwardly of the first polarization selecting means, second polarization rotating means. for producing only an error amount from the 45-degree rotation of the polarization plane, effected by the first polarization rotating means, with respect to the transmitted light through the wavelength selecting means, second polarization selecting means for selecting the light of polarization which is different from that selected by the first polarization selecting means selects, and a mirror provided rearwardly of the second polarization selecting means.

According to a tenth aspect of the invention, there is provided a beam distributor for use in the optical pressure sensor so as to distribute the light from the light source among a plurality of portions, the beam distributor comprising a plurality of juxtaposed active mirrors each comprising a pair of transparent members closely spaced from each other, the spacing between the two transparent members being changed by space adjusting means so that the light beam, applied to the active mirror, can be selectively reflected and transmitted.

According to an eleventh aspect of the invention, there is provided a sensing probe for use in the above multipoint-measuring optical sensor system using the optical pressure detection method wherein light from a light source is split into at least two light beams respectively defining a reference beam and a measurement beam; the reference beam is passed through a reference medium whereas the measurement beam is passed through a pressure-sensitive medium which varies in refractive index in accordance with a pressure; the difference between a length of an optical path of the reference beam and a length of an optical path of the measurement beam after the reference and measurement beams pass through their respective mediums is determined; and the pressure of the pressure-sensitive medium is detected from the optical path length difference; the pressures of the pressure-sensitive mediums, provided respectively at a plurality of detection portions remote from the light source, are detected;

the sensing probe comprising:

means provided remote from the light source for splitting the light beam from the light source to form the reference beam and the measurement beam;

means having the reference medium sealed therein for forming an optical path therein along which the reference beam passes;

means forming an optical path along which the measurement beam passes through the pressure-sensitive medium which varies in refractive index in accordance with a pressure; and means for feeding the reference and measurement beams, passed respectively through the reference medium and the pressure-sensitive medium, to a light-receiving portion so as to determine the optical path length difference.

The present invention will be described more specifically. In order to achieve the first object, particularly in the sensing probe, the light, applied thereto from the light source, is split into the measurement beam and the reference beam, and the measurement beam is passed through the pressure-sensitive medium containing gas equal in pressure to the object to be measured, and the reference beam is passed through the reference medium containing sealed gas (different from the gas to be measured), vacuum or a solid material. The measurement beam and the reference beam are caused to interfere with each other so that the optical path length difference, corresponding to a pressure change developing in the first gas, is detected. Thus, the measurement is effected using the light, and therefore no special explosion-proof construction is needed, and besides since the sensing probe has no moving part, the highly-reliable pressure detection can be carried out.

In order to achieve the second object, the light is fed to the sensing probe via the polarization plane-reserving fiber, and the light is fed from the sensing probe to the signal processing portion via the fiber. In the first construction, the measurement signal is fed to the signal processing portion via the same fiber as the fiber which feeds the light to the sensing probe, and the outgoing light is split into the two beams in terms of polarization, and the pressures are calculated respectively from these beams, and then the thus calculated values are added together, thereby canceling the influences of disturbances (e.g. vibrations) produced when the light passes through the fiber. In the second construction, the light beams (having different polarization planes), passed through the fiber, are caused to interfere with each other before the light is split into the measurement beam and the reference beam, thereby obtaining the compensation signal, and the measurement signal and the compensation signal are fed to the signal processing circuits via the two fibers, and the values, obtained from these circuits, are added together, thereby canceling the influences of the disturbances. In the third construction, the same polarization components in the measurement and reference beams are selected, and are caused to interfere with each other, and these light components are fed to the signal processing circuit via the two fibers, and the values, obtained from these circuits, are subtracted from each other, thereby canceling the influences of the disturbances. In the fourth construction, the polarization rotating and selecting means is inserted in the optical path of each of the measurement beam and the reference beam, the light of different polarization is selected in the form of the reference beam and the measurement beam, and its polarization plane is rotated by 90 degrees, and this light beam is again fed to the signal processing portion via the polarization plane-reserving fiber, thereby solving the problem.

Thus, the light source, the signal processing portion and the sensing probe are connected together by the fibers, so that the sensor system can be easily handled. More specifically, in the first construction, the return light beams from the sensing probe, though different in polarization, are subjected to the same disturbances, and therefore by adding these beams together, the influences of the disturbances, developing when the light beams pass through the fibers, are canceled. In the second construction, the measurement signal contains information of the disturbances and the pressure, and the compensation signal contains information of the disturbances, and therefore using the two signals, only the pressure information can be obtained. In the third construction, the measurement beam and the reference beam, selected by polarization and interfering with each other, propagate to the sensing probe separately in two different modes, and therefore by subtracting the measured values from each other, obtained from the two sets of interference signals, the influences of the disturbances, developing when the beams pass through the fiber, are canceled. In the fourth construction, each of the measurement beam and the reference beam advances and returns through the polarization fiber, with its polarization plane rotated by 90 degrees, and therefore even if the refractive indexes of the polarization plane-reserving fiber for the two modes are varied under the influence of the disturbances, these are canceled.

In order to achieve the third object, there is provided the sensor system in which the light from the light source is distributed among the plurality of measuring points, and the light beams returned therefrom are detected by the photodetectors, and then the signal from the desired measuring point is selected by electrical means. In a specific form for achieving the third object, there are provided the active mirrors each for selectively transmitting and reflecting the light by the control signal, so that the signal of the desired measuring point is selected.

In order to achieve the fourth object, the simultaneous measurements are effected using the two wavelength. In order to achieve the fifth object, the medium whose temperature dependency for the optical path length is equal to that for the optical path length of the measurement beam, is provided in the optical path of the reference beam. In order to achieve the sixth object, the pressure is determined from the optical path length difference between the reference beam and the measurement beam.

In the optical pressure sensor wavelength plate, the polarization selecting device, the beam distributor, the multipoint-measuring optical pressure sensor system, and as well the embodiments of the invention described hereafter, with the use of the results of the measurement using the two wavelengths, the wavelength of the light source can be increased in an equivalent manner without the sacrifice of the measurement precision. A change of the optical path length of the measurement beam and a change of the optical path length of the reference beam, both of which are due to a change of the ambient temperature, cancel each other, and therefore an error due to the change of the ambient temperature can be eliminated. And besides, the optical path length difference between the reference beam and the measurement beam will not be affected by a variation of the light amount and so on.

Other features, constructions and effects of the present invention will be clearly understood from the preferred embodiments of the invention and the accompanying drawings.

DESCRIPTION OF THE PREFERRED EMBODIMENTS

Preferred embodiments of the present invention will now be described in detail with reference to the accompanying drawings.

First, an optical pressure sensor system according to a first embodiment of the invention will now be described with reference to FIGS. 1 to 6.

Figure 1:
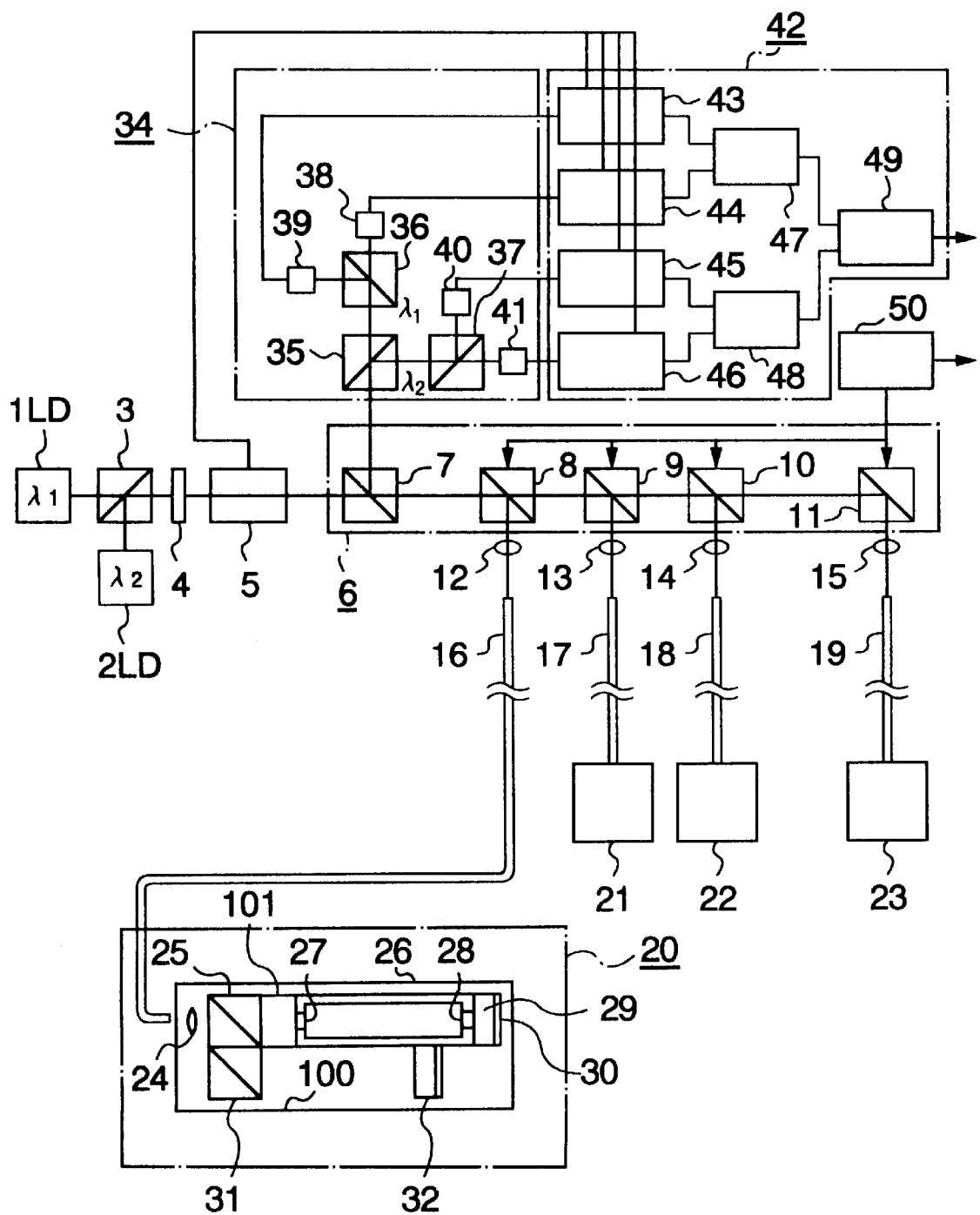
FIG. 1 is a view showing a multipoint-measuring optical pressure sensor system constituted by a first embodiment of an optical pressure sensor of the invention for detecting a pressure of gas.

FIG. 1 shows an overall construction of an optical pressure sensor of the invention, and each of light sources 1 and 2 comprises a laser diode (LD), and these LD light sources 1 and 2 respectively emit light beams respectively having wavelengths $\lambda_1$ and $\lambda_2$. A beam splitter 3 combines the light beams, emitted respectively from the LD light sources 1 and 2, together. A polarization plate 4 allows only that polarization component of the incident light, defining an angle of 45 degrees with respect to the sheet of the drawings, to transmit therethrough. A phase modulator 5 modulates the phase difference between that component of the incident light, having a polarization plane perpendicular to the sheet of the drawings, and that component of the incident light having a polarization plane parallel to the sheet of the drawings.

A light distributor 6 comprises a beam splitter 7 and a plurality of active mirrors 8, 9, 10 and 11. As will hereafter more fully be described with reference to FIG. 6 these active mirrors function to transmit or reflect the light, incident thereon, in response to an output from a switching circuit. Laser beams, fed respectively from the active mirrors 8, 9, 10 and 11, pass respectively through lenses 12, 13, 14 and 15, and are led or directed respectively to polarization plane-reserving fibers 16, 17, 18 and 19. The polarization plane-reserving fibers 16, 17, 18 and 19 propagate the light, having a polarization plane perpendicular to the sheet of the drawings, and the light having a polarization plane parallel to the sheet of the drawings, while maintaining the polarization planes of these light beams. However, each of these fibers 16 to 19 have different refractive indexes ns and np respectively for the light, having the polarization plane perpendicular to the sheet of the drawings, and the light having the polarization plane parallel to the sheet of the drawings.

The laser beams, sent respectively from the polarization plane-reserving fibers 16, 17, 18 and 19, are fed respectively to sensing probes 20, 21, 22 and 23. The sensing probe 20 comprises a base 100, a lens 24, a beam splitter 25, a temperature compensation member 101, a hermetically-sealed container 26, transparent windows 27 and 28 provided on the hermetically-sealed container 26, a ¼ wavelength plate 29 with a reflecting film, a reflecting film 30 formed on the ¼ wavelength plate 29, and mirrors 31 and 32. The interior of the hermetically-sealed container 26 is kept under a vacuum. Incidentally, by mounting a plurality of (for example, 10 to 20) of this sensing probes respectively at pressure detection positions distant from the light source, there can be provided a system capable of effecting a multipoint measurement.

A light-receiving portion 34 comprises a beam splitter 35 of the wavelength selecting type, polarization beam splitters 36 and 37, and photodetectors 38, 39, 40 and 41. The beam splitter 35 of the wavelength selecting type transmits the light having the wavelength $\lambda_1$ therethrough, and reflects the light having the wavelength $\lambda_2$.

A signal processing portion 42 comprises signal processing circuits 43, 44, 45 and 46, adder circuits 47 and 48, and an arithmetic circuit 49. Each of the signal processing circuits 43 to 46 determines the optical path length difference between a light component (of the light incident on the phase modulator 5), having a polarization plane perpendicular to the sheet of the drawings, and a light component (of the light incident on the phase modulator 5) having a polarization plane parallel to the sheet of the drawings. Theses are disclosed, for example, in Japanese Patent Unexamined Publication No. 62-27603 and U.S. Pat. No. 4,708, 481. This device measures the optical path length difference, using $\lambda$ as a unit, and outputs only a decimal value which is a non-dimensional value obtained by division by $\lambda$.

The switching circuit 50 drives the light distributor 6 so as to selectively supply the light to one of the fibers 16 to 19.

The operation of the optical pressure sensor of the above construction will now be described. The light beams with the respective wavelengths $\lambda_1$ and $\lambda_2$, emitted respectively from the LD light sources 1 and 2, are combined together by the beam splitter 3, and pass through the polarization plate 4. The light, thus passed through this polarization plate 4, has the polarization plane disposed at an angle of 45° with respect to the sheet of the drawings. Then, the phase difference between the parallel polarization component and perpendicular polarization component of the light is modulated by the phase modulator 5. The outgoing light from the phase modulator 5 enters the light distributor 6 where the light passes through the beam splitter 7, and then reaches the active mirrors 8 to 11.

Here, any one of the active mirrors 8 to 11 is set to a reflecting mode by the switching circuit 50 while the other active mirrors are set to a transmitting mode. Assuming that the active mirror 8 is set to the reflecting mode, the light is reflected by this mirror, and is incident on the polarization plane-reserving fiber 16 through the lens 12. The outgoing light from the polarization plane-reserving fiber 16 is converted into parallel rays of light by the lens 24 in the sensing probe 20, and then reaches the beam splitter 25, so that this light is divided or split into two light beams, that is, transmitted light (reference beam) and reflected light (measurement beam). More specifically, the reference beam enters the hermetically-sealed container 26 through the transparent window 28, and further passes through the transparent window 28 to reach the ¼ wavelength plate 29, and then is reflected by the reflecting film 30 formed on the back side or surface of the ¼ wavelength plate 29. On the other hand, the measurement beam is reflected by the mirror 31 to reach the mirror 32, and is reflected by the mirror 32.

The thus reflected reference beam and measurement beam are reversed in the sensing probe 20 with respect to the direction of travel thereof, and reach the active mirror 8 through the lens 24, the polarization plane-reserving fiber 16 and the lens 12, so that the light is reflected by the active mirror 8. The light is further reflected by the beam splitter 7 to reach the light-receiving portion 34. In the light-receiving portion 34, the incident light is first split by the beam splitter 35 of the wavelength selecting type in accordance with the wavelength. More specifically, the light of a wavelength $\lambda_1$ passed through this beam splitter 35 is directed to the polarization beam splitter 36 while the light of a wavelength $\lambda_2$ reflected by the beam splitter 35 is directed to the polarization beam splitter 37. The polarization beam splitter 36 further splits the incident light of the wavelength $\lambda_1$ into two light beams which are directed respectively to the photodetectors 38 and 39. Similarly, the polarization beam splitter 37 splits the incident light of the wavelength $\lambda_2$ into two light beams which are directed respectively to the photodetectors 40 and 41.

Each of the photodetectors 38 to 41 converts the incident light beam into an electric signal which is inputted to the signal processing portion 42. In the signal processing portion 42, the optical path length difference between the measurement beam and the reference beam is determined by the signal processing circuits 43 and 44, and results thereof are inputted to the addition circuit 47. Therefore, even if disturbances such as a temperature change and vibrations, are applied to the polarization plane-reserving fiber 16, the optical path length difference can be accurately obtained. Although the optical path length of the measurement beam varies with the change of the atmospheric pressure of the air, the optical path length of the reference beam does not vary since the reference beam pass through the vacuum. Therefore, by determining the optical path length difference between the measurement beam and the reference beam, the atmospheric pressure can be accurately measured.

Let's consider the optical path length difference between the measurement beam and the reference beam. Reference is first made to the optical path length in the various portions. Let's assume that $l_1$ represents the optical path length from the light source 1 to the polarization plane-reserving fiber 16, $l_2$ represents the optical path length from the polarization plane-reserving fiber 16 to the beam splitter 25, $l_3$ represents the optical path length from the beam splitter 25 to the reflecting film 30 formed on the back surface of the ¼ wavelength plate 29, and $l_4$ represents the optical path length from the beam splitter 25 to the mirror 32. If the length of the polarization plane-reserving fiber 16 is represented by $d_f$, the optical path length for the light having the polarization plane perpendicular to the sheet of the drawings is represented by $d_f \times n_s$, and the optical path length for the light having the polarization plane parallel to the sheet of the drawings is represented by $d_f \times n_p$.

Reference is first made to the length of the optical path along which the light of the wavelength $\lambda_1$, emitted from the light source 1, reaches the sensing probe 20, and is reflected there, and then reaches the beam splitter 35 of the wavelength selecting type in the light-receiving portion 34. The light (emitted from the light source 1) having the polarization plane perpendicular to the sheet of the drawings passes through the beam splitter 7, the active mirror 8 and the polarization plane-reserving fiber 6, and reaches the beam splitter 25 in the sensing probe 20, and this light is split into the transmitted light (first reference beam) and the reflected light (first measurement beam). This first reference beam is reflected by the reflecting film 30, formed on the back surface of the ¼ wavelength plate 29, to be returned to the beam splitter 25, and then reaches the beam splitter 35 of the wavelength selecting type via the polarization plane-reversing fiber 16, the active mirror 8 and the beam splitter 7. The polarization plane of the first reference beam is rotated by 90 degrees so as to be parallel to the sheet of the drawings when it is reflected by the reflecting film 30. On the other hand, the polarization plane of the first measurement beam does not vary. Therefore, the optical path length $L_1$ of the first reference beam and the optical path length $L_2$ of the measurement beam are expressed respectively by the following formulas:

$$L_1 = l_1 + 2 \times l_2 + 2 \times l_3 + d_f \times n_s + d_f \times n_p \quad \text{Formula 1}$$

$$L_2 = l_1 + 2 \times l_2 + 2 \times l_4 + 2 \times d_f \times n_s \quad \text{Formula 2}$$

Similarly, the light, having the polarization plane parallel to the sheet of the drawings, also reaches the beam splitter 25, and is split by this beam splitter 25 into the transmitted light (second reference beam) and the reflected light (second measurement beam). In this case, also, although the polarization plane of the second reference beam is rotated by 90 degrees, the polarization plane of the second measurement beam is not rotated. Therefore, the optical path length $L_3$ of the second reference beam and the optical path length $L_4$ of the second measurement beam are expressed respectively by the following formulas:

$$L_3 = l_1 + 233\ l_2 + 2 \times l_3 + d_f \times n_s + d_f \times n_p \quad \text{Formula 3}$$

$$L_4 = l_1 + 233\ l_2 + 2 \times l_4 + 2 \times d_f \times n_p \quad \text{Formula 4}$$

Then, the first measurement beam and the second reference beam among the above four beams (i.e., the first and second reference beams and the first and second measurement beams) have their respective polarization planes parallel to the sheet of the drawings, and therefore are reflected by the polarization beam splitter 36, and interfere with each other. The optical path length difference $\Delta L_{23}$ between these two beams is expressed by the following formula:

$$\Delta L_{23} = L_2 - L_3 = -2 \times (l_3 - l_4) + d_f \times n_s - d_f \times n_p \quad \text{Formula 5}$$

On the other hand, the first reference beam and the second measurement beam have their respective polarization plane parallel to the sheet of the drawings, and therefore transmit through the polarization beam splitter 36, and interfere with each other. The optical path length difference $\Delta L_{41}$ between these two beams is expressed by the following formula:

$$\Delta L_{41} = L_4 - L_1 = -2 \times (l_3 - l_4) + d_f \times n_s - d_f \times n_p \qquad \text{Formula 6}$$

In the signal processing portion 42, the optical path length differences $\Delta L_{23}$ and $\Delta L_{41}$, expressed respectively by the above formulas, are measured by the signal processing circuits 43 and 44, and therefore the optical length difference $\Delta L\lambda$ expressed by the following formula is outputted from the adder circuit 47:

$$\Delta L(\lambda_1) = \Delta L_{41} + \Delta L_{23} = -4(l_3 - l_4) \qquad \text{Formula 7}$$

Therefore, even if disturbances, such as a temperature change and vibrations, are applied to the polarization plane-reserving fiber 16, so that the refractive index thereof is varied, this will not affect the output of the adder circuit 47 of the signal processing portion 42, and the optical path length difference between the measurement beam and the reference beam (actually, −4 times larger than that) is measured. Similarly, the procedure as described above is established with respect to the measurement using the light of the wavelength $\lambda_2$ emitted from the light source 2. Namely, the optical path length difference $\Delta L\lambda_2$ expressed by the following formula is outputted from the adder circuit 48:

$$\Delta L(\lambda_2) = -4(l_3 - l_4) \qquad \text{Formula 8}$$

Next, the principle, in which the range of the measurable optical path length difference between the measurement beam and the reference beam is increased by determining the optical path length difference with the use of the different wavelengths, will be described with reference to FIG. 2. In the signal processing portion 42, the optical path length difference is determined by detecting the phase difference between the measurement beam and the reference beam. This phase difference can be expressed by $2n\pi+\theta$ (n=0, 1, 2, 3 . . . ) which corresponds to $n\lambda+\Delta L'$ in the term of the optical path length difference. This formula, is non-dimensionalized by dividing with $\lambda$ so as to obtain $n+\Delta L'/\lambda$. In the output of the adder circuit 47 of the signal processing circuit 42, only the value of $\theta$ in the above formula, determining the phase difference, can be obtained. Namely, in the above formula representing the actual optical path length difference, the value corresponding to $\Delta L'/\lambda$ is obtained as the output.

Figure 2:
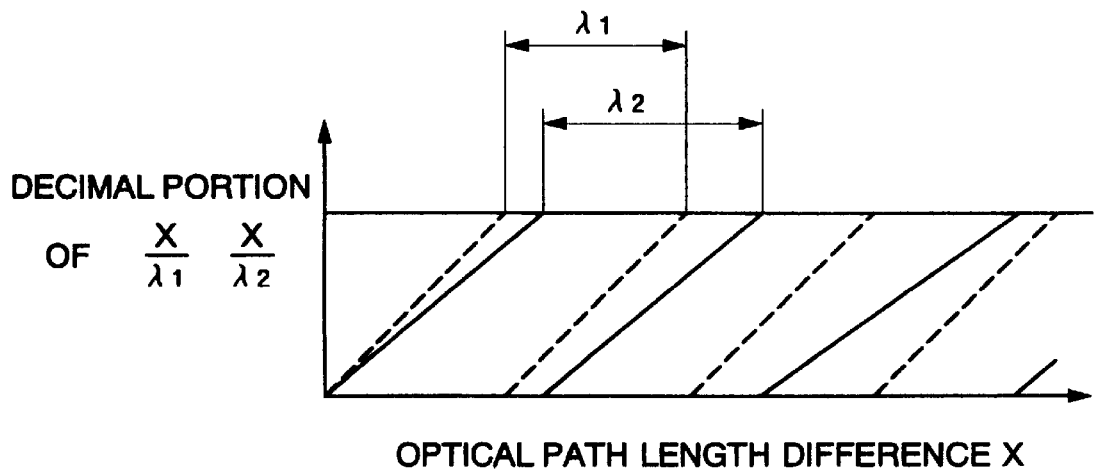
FIG. 2 is a diagram showing the relation between an optical path length difference and an output of an adder circuit in the pressure detection effected by the optical pressure detection method and the optical pressure sensor shown in FIG. 1.

FIG. 2 shows the relation between the optical path length difference X and the output value of the adder circuits 47 and 48. More specifically, the output of the adder circuits 47 and 48 is zero (0) when the optical path length difference is zero (0), and this output increases linearly until the optical path length difference reaches the value of $\lambda$, and then the output again becomes zero (0). Namely, the output value is cyclic or periodic, and generally the value from 0 to $\lambda$ is cyclically obtained with respect to $x=n\lambda+\Delta L$. Namely, if the optical path length difference X is measured in terms of the wavelength unit (that is, the optical path length difference is made dimensionless by the wavelength), only the value of $\Delta L/\lambda$ (that is, the decimal portion) out of $n+\Delta L/\lambda$ is obtained. Therefore, if the optical path length difference X is measured using a single wavelength, only $\Delta L/\lambda$ is obtained, and the value (0, 1, 2, 3 . . . ) of n can not be specified. In the present invention, however, the optical path length differences are measured using the light beams of the difference wavelengths $\lambda_1$ and $\lambda_2$, and the optical path length differences $x_1$ and $x_2$, corresponding respectively to the wavelengths $\lambda_1$ and $\alpha_2$, are determined, and the value of n is determined through comparison between the two optical path length differences. This will be described in detail.

$$X = x_1 \lambda_1 \qquad \text{Formula 9}$$

$$X = x_2 \lambda_2 \qquad \text{Formula 10}$$

Therefore, the following formula is established:

$$x_1 \lambda_1 = x_2 \lambda_2 \qquad \text{Formula 11}$$

Namely, the outputs of the adder circuits 47 and 48 represent the decimal portions $\alpha_1$ and $\alpha_2$ of $x_1$ and $x_2$, respectively, and these can be expressed respectively by the following formulas using a gauss's sign [ ]:

$$\alpha_1 = x_1 - [x_1] \qquad \text{Formula 12}$$

$$\alpha_2 = x_2 - [x_2] \qquad \text{Formula 13}$$

From the known values $\lambda_1$, $\lambda_2$, $\alpha_1$ and $\alpha_2$, all sets of integers ($[x_1]$, $[x_2]$) satisfying the above formula 11 are found. At least one set exists, but when a plurality of sets are found, that set, in which the optical path length difference between the measurement beam and the reference beam is a minimum, is selected (here, if a plurality of sets are found, no problem arises even though any of them is selected.). In the subsequent measurement, a set of integers satisfying the above formula 11 is used (here, if a plurality of sets are found, that set of numerical values closest to the precedingly-selected set of numerical values are selected). With this method, even if the optical path length difference obtained in the preceding measurement is different from the optical path length difference obtained in the subsequent measurement, so that the values of the set of integers ($[x_1]$, $[x_2]$) vary, the accurate value can be obtained or determined.

Reference is made to the range of measurement of the optical path length difference according to the above method. First, if a plurality of lattice points, satisfying the above formula 11, exist in a plane $x_1-x_2$, it will be verified that no two points whose decimal portions $\alpha_1$ and $\alpha_2$ coincide with each other exit between adjacent lattice points $(a_1, a_2)$ and $(a_1', a_2')$ (however, $a_1 < a_1'$; $a_2 < a_2'$)

Let's assume that points whose decimal portions coincide with each other exist between the lattice points $(a_1, a_2)$ and $(a_1', a_2')$. If that point close to the lattice point $(a_1, a_2)$ is represented by $(x_1, x_2)$ whereas that point remote therefrom is represented by $(x_1', x_2')$, the point $(x_1'-x_1+a_1, x_2'-x_2+a_2)$ is the lattice point, and since $a_1' > x_1'-x_1+a_1$, and $a_2' > x_2'-x_2+a_2$ are established, this is contrary to the assumption that the point $(a_1, a_2)$ and the point $(a_1', a_2')$ are the adjacent lattice points.

Therefore, the amount, obtained by multiplying the difference $\Delta[x_1]$ (in the value $[x_1]$ between the adjacent lattice points) by $\lambda_1$, defines the range in which the optical path length can be univocally determined only from the decimal portion. Here, the ratio of $\lambda_1/\lambda_2$ is expressed by the following formula:

$$\lambda_1/\lambda_2 = l/k \qquad \text{Formula 14}$$

where k and l are both prime positive integers.

When this formula is applied to the above formula 11 to eliminate $\lambda_1$ and $\lambda_2$, the following formula 15 is obtained:

$$kx_1 = lx_2 \qquad \text{Formula 15}$$

Since k and l are both prime, the minimum values of the differences $\Delta[x_1]$, $\Delta[x_2]$ from other set $[x_1]$, $[x_2]$) satisfying this are 1 and k, respectively. Therefore, if a change or variation ΔX of the optical path length difference is within $1\Delta[x_1]$, the value of X satisfying the above formula 11 is univocally determined (If the ratio $\lambda_1/\lambda_2$ is an irrational number, so that it can not be expressed by the above formula 14, X is determined over the entire range in principle.). For example, if $\lambda_1$=780 nm and $\lambda_2$=830 nm are provided, k=78 and l=83 are obtained. Therefore, the optical path length difference is within $\Delta X=1\Delta[x_1]=83\times 780=64740$ nm=64.7 μm, the optical path length difference can be determined univocally.

Figure 3:
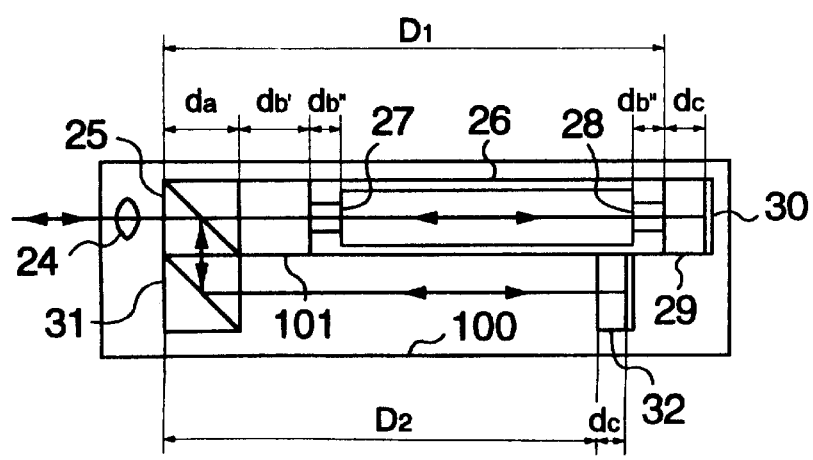
FIG. 3 is a view explaining a sensing probe of the multipoint-measuring optical pressure sensor system of FIG. 1, showing the pressure-detecting principle of the optical pressure sensor of the invention.

Next, a method of correcting an error due to a temperature change will be described. FIG. 3 is a view explanatory of the sensing probe 20, and in this Figure, the base 100, the lens 24, the beam splitter 25, the temperature compensation member 101, the hermetically-sealed container 26, the transparent windows 27 and 28 and the mirror 31 are all made of quartz glass. As will hereafter be more fully described, the mirror 32 is made of the same material as that of the ¼ wavelength plate 29, and has the same temperature characteristics as those of the ¼ wavelength plate 29. The beam splitter 25 as well as the mirror 31 has a body of a square shape whose sides are represented $l_a$. The thickness of the temperature compensation member 101 is represented by $d_b'$, the thickness of the transparent windows 27 and 28 is represented by $d_b''$, and the thickness of the mirror 32 is represented $d_c$.

The optical path length of each of the mirror 32 and the ¼ wavelength plate 29 is represented by $lQ_{op}$, the distance from the beam splitter 25 to the ¼ wavelength plate 29 is represented by $D_1$, and the distance from the mirror 31 to the mirror 32 is represented by $D_2$. Therefore, one-way optical path length $L_r$ of the reference beam from the beam splitter 25 to the mirror 32, and one-way optical path length $L_m$ of the measurement beam are expressed respectively by the following formulas:

$$L_r = (d_a+d_b)n_Q + (D_1-d_a-d_b)n_{vac} + lQ_{op} \quad \text{Formula 16}$$

$$L_m = 2d_a n_Q + (D_2-d_a)n_{air} + lQ_{op} \quad \text{Formula 17}$$

where $n_{vac}$ represents the refractive index (=1) of vacuum, $n_{air}$ represents the refractive index of the air, and $n_Q$ represents the refractive index of quartz glass. In the above formulas, $d_b=d_b'+2d_b''$ (Formula 18) is provided. Therefore, the optical path length difference $L_m-L_r$ between the measurement beam and the reference beam is expressed by the following formula:

$$L_m-L_r = 2d_a n_Q + (D_2-d_a)n_{air} - (d_a+d_b)n_Q + D_1 - d_a - d_b \quad \text{Formula 19}$$

Here, a change of the optical path length difference due to a change of the temperature T is determined or found. Here, the lengths and the refractive indexes vary in accordance with the following formulas:

$$d_a = d_{ao}(1+\alpha_Q T) \quad \text{Formula 20}$$

$$d_b = d_{bo}(1+\alpha_Q T) \quad \text{Formula 21}$$

$$D_1 = D_{10}(1+\alpha_Q T) \quad \text{Formula 22}$$

$$D_2 = D_{20}(1+\alpha_Q T) \quad \text{Formula 23}$$

$$n_Q = n_Q + \beta_Q T \quad \text{Formula 24}$$

$$n_{air} = n_{air} + \beta_{air} T \quad \text{Formula 25}$$

In the above formulas, $d_{ao}$, $d_{bo}$, $D_{10}$, $D_{20}$, $n_Q$ and $n_{air}$ represent the respective lengths and refractive indexes when the temperature T is zero (T=0).

The above formulas are applied to the above formula 19, and the formula is arranged ignoring the high-order terms representing the temperature coefficients $\alpha_Q$ and $\beta_Q$ and so on, so that the following formula is obtained:

$$L_m - L_r = (d_a + d_b)n_Q + (D_{20} + D_{ao})n_{air} - \\ D_{10} + d_a + d_b + [(d_a + d_b)(\beta_Q + n_Q \alpha_Q) + \\ (D_{20} + d_a)(\beta_{air} + n_{air}\alpha_Q) - (D_{10} - d_{ao} - d_{bo})\alpha_Q]T \quad \text{Formula 26}$$

If the right side of the formula 26 is regarded as the function of T, and its zero-order coefficients (constant terms) are replaced by zero (0), then there is obtained a condition in which the optical path length difference $L_m-L_r$ between the measurement beam and the reference beam becomes constant when T=0. Further, if the first-order coefficients are replaced by zero (0), there is obtained a condition in which the optical path length difference $L_m-L_r$ between the measurement beam and the reference beam is not varied even if the temperature T changes. When these two conditions are both satisfied, there is obtained a condition in which the optical path length difference $L_m-L_r$ is zero (0) even if the temperature T changes. For example, if $d_{ao}$=10 mm, $n_{Qo}$=1.458, $D_{10}$=50 mm, $\alpha_Q$ =5.5×10⁻⁷/° C., $\beta_Q$=9.6×10⁻⁶/° C., $\beta_{air}$=1.05×10⁻⁶/° C., and $n_{air}$=1.0 are provided, $d_b''$=7.017 mm and $D_{20}$=38.634 mm are obtained. Therefore, if the thickness of the transparent windows 27 and 28 is 2 mm, the thickness of the temperature compensation member 101 is 3.017 mm.

Figure 4:
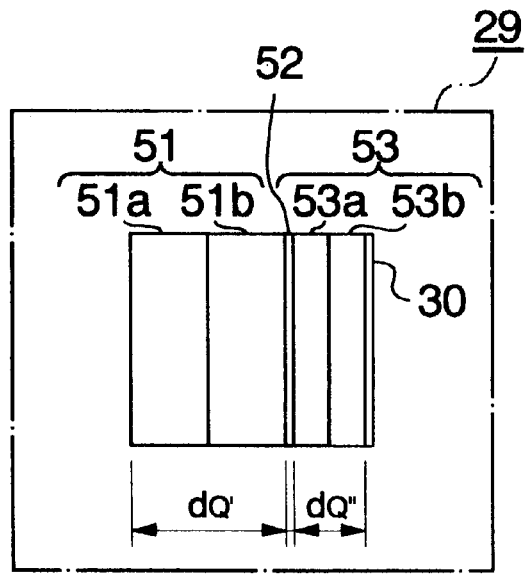
FIG. 4 is a view showing one example of a ¼ wavelength plate of the multipoint-measuring optical pressure sensor system shown in FIG. 1.

FIG. 4 is a view showing the construction of the ¼ wavelength plate 29. In this Figure, reference numeral 51 denotes a ¼ wavelength plate for the light having the wavelength $\lambda_1$, and reference numeral 52 denotes a reflecting film of the wavelength-selecting type which reflects the light of the wavelength $\lambda_1$, but transmits the light of the wavelength $\lambda_2$ therethrough. Reference numeral 53 denotes a compensation plate which compensates for the phase difference for the light of the wavelength $\lambda_2$ to serve, together with the ¼ wavelength plate 51, as a ¼ wavelength plate. Reference numeral 30 denotes the reflecting film. The ¼ wavelength plate 51 comprises two crystal plates 51a and 51b whose crystal axes are displaced by 90 degrees with respect to each other, the two crystal plates 51a and 51b being different several tens of μm in thickness from each other. (For example, see "Handbook of Optics" 1978, McGraw-Hill Book Company, 10–112 pages.)

Here, the combined thickness of the crystal plates 51a and 51b is represented by $d_Q'$. Similarly, the compensation plate 53 comprises two crystal plates 53a and 53b of different thicknesses whose crystal axes are displaced by 90 degrees with respect to each other, and the combined thickness of the crystal plates 53a and 53b is represented by $d_Q''$. Since the light of the wavelength $\lambda_1$, entering the ¼ wavelength plate 29, is reflected by the reflecting film 52 of the wavelength-selecting type, its polarization plane is rotated by 90 degrees. On the other hand, since the light of the wavelength $\lambda_2$ goes and returns through the ¼ wavelength plate 51 and the compensation plate 53, its polarization plane is also rotated 90 degrees. The ¼ wavelength plate 51 and the compensation plate 53 are made, for example, of crystal.

Figure 5:
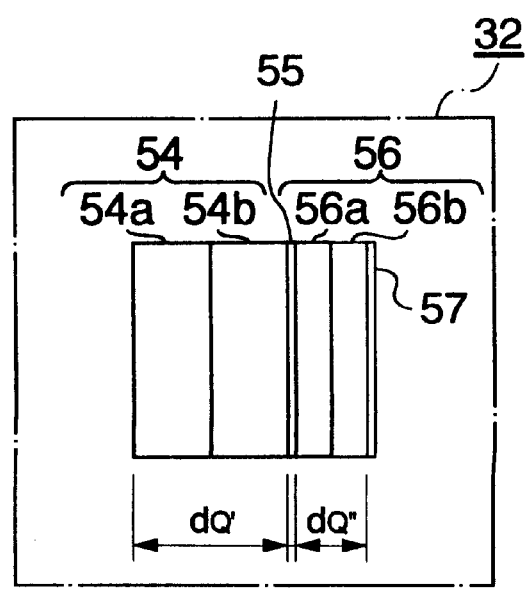
FIG. 5 is a view showing one example of a mirror of the multipoint-measuring optical pressure sensor system shown in FIG. 1.

FIG. 5 shows the construction of the mirror 32. In this Figure, reference numeral 54 denotes a transparent member which comprises two crystal plates 54a and 54b whose crystal axes are displaced by 90 degrees with respect to each other, each of the two crystal plates 54a and 54b having a thickness of $d_Q'/2$. Therefore, the combined thickness of the crystal plates 54a and 54b is equal to the thickness of the ¼ wavelength plate 51, and hence is $d_Q'$. Reference numeral 55 denotes a reflecting film of the wavelength-selecting type which reflects the light of the wavelength $\lambda_1$ but transmits the light of the wavelength $\lambda_2$ therethrough. Reference numeral 56 denotes a transparent member which comprises two crystal plates 56a and 56b whose crystal axes are displaced by 90 degrees with respect to each other. Each of the two crystal plates 56a and 56b having a thickness of $d_Q''/2$, and therefore the transparent member 56 has a thickness of $d_Q''$. Reference numeral 57 denotes a reflecting film. The ¼ wavelength plate 29 and the mirror 32 have the same optical nature except that the former has the function of rotating the polarization plane of the incident light through 90 degrees.

Figure 6A:
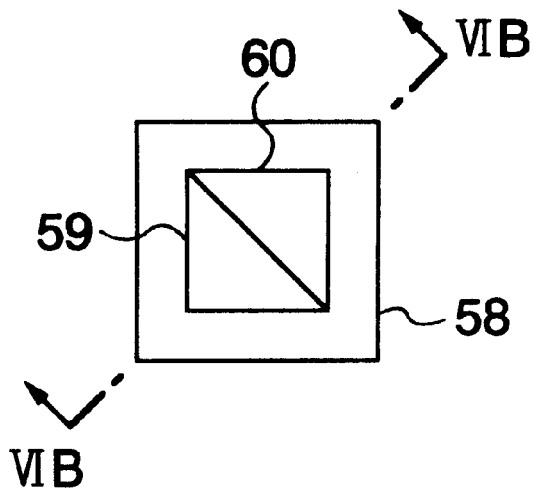
FIG. 6A is a top plan view of one example of an active mirror of the multipoint-measuring optical pressure sensor system shown in FIG. 1.
Figure 6B:
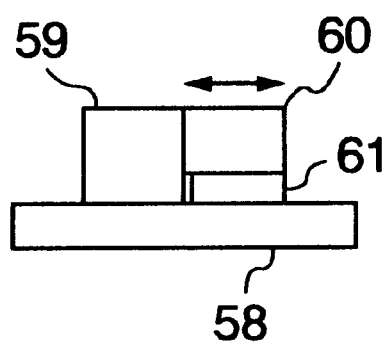
FIG. 6B is a side-elevational view of the active mirror shown in FIG. 6A.

FIG. 6A is a top plan view showing the construction of the active mirror 8, 9, 10, 11, and FIG. 6B is a side-elevational view thereof. Reference numeral 58 denotes a base, and reference numerals 59 and 60 denote prisms. The base 58 and the prisms 59 and 60 are held in intimate contact with one another. Reference numeral 61 denotes a piezoelectric element which causes displacement upon reception of voltage. The prism 60 is mounted on the piezoelectric element 61. In the active mirror of this construction, the prisms 59 and 60 are normally held in close contact with each other, and therefore the incident light transmits through these prisms. However, when voltage is applied to the piezoelectric element 61, the prism 60 is moved slightly apart from the prism 59, so that the incident light is reflected.

In the embodiment described above in detail, although the ¼ wavelength plate 29 is provided in the optical path of the reference beam whereas the mirror 32 is provided in the optical path of the measurement beam as is clear from FIGS. 1 and 3, this arrangement may be reversed.

Figure 7:
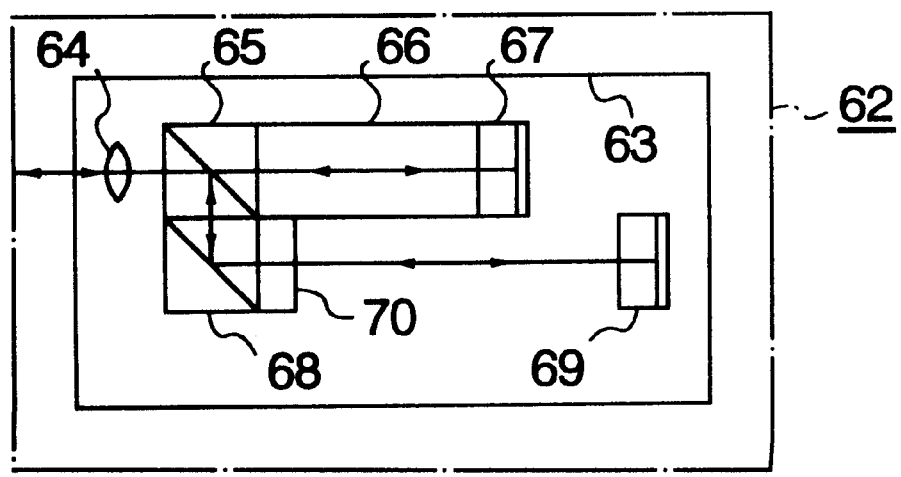
FIG. 7 is view showing a modified sensing probe for the multipoint-measuring optical pressure sensor system of the invention.
Figure 8:
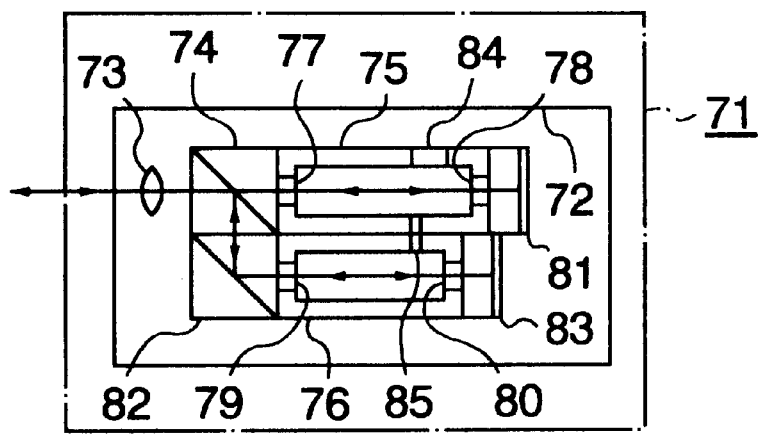
FIG. 8 is a view showing another modified sensing probe for the multipoint-measuring optical pressure sensor system of the invention.

FIGS. 7 and 8 show modified forms of the sensing probe of FIG. 3, respectively. The modified sensing probe 62 of FIG. 7 comprises a base 63, a lens 64, a beam splitter 65, a quartz rod 66, a ¼ wavelength plate 67 with a reflecting film, mirrors 68 and 69, and a compensation glass member 70. The base 63, the beam splitter 65 and the quartz rod 66 are made of quartz glass, and the compensation glass member 70 is made of optical glass (e.g. BK7) which has temperature dependency of an optical path length different from that of the above quartz glass, and this compensation glass member 70 compensates for a variation or change of the optical path length due to a temperature change. The ¼ wavelength plate 67 with the reflecting film and the mirror 69 are identical in construction respectively to the ¼ wavelength plate 29 and the mirror 32 in the first embodiment. As is clear from the above description of the construction thereof, this sensing probe does not require a hermetically-sealed container, and therefore advantageously, it is simple in construction, and can be manufactured at low costs.

The sensing probe 71 of FIG. 8 comprises a base 72, a lens 73, a beam splitter 74, containers 75 and 76, transparent windows 77, 78, 79 and 80, a ¼ wavelength plate 81 with a reflecting film, and mirrors 82 and 83. The base 72, the beam splitter 74 and the containers 75 and 76 are made of quartz glass. The interior of the container 75 communicates with the exterior through a hole 84, and also communicates with the interior of the container 76 through a small hole 85. The ¼ wavelength plate 81 with the reflecting film and the mirror 83 are identical in construction respectively to the ¼ wavelength plate 29 and the mirror 32 in the first embodiment. In this sensing probe 71, when the ambient or outside atmospheric pressure varies, the pressure within the container 75 is first made equal to the outside pressure through the hole 84, and then the pressure within the container 76, connected to the container 75 through the small hole 85, is made equal to the outside pressure. This sensing probe 71 detects an optical path length difference in terms of a pressure change in this unbalanced condition.

Figure 9:
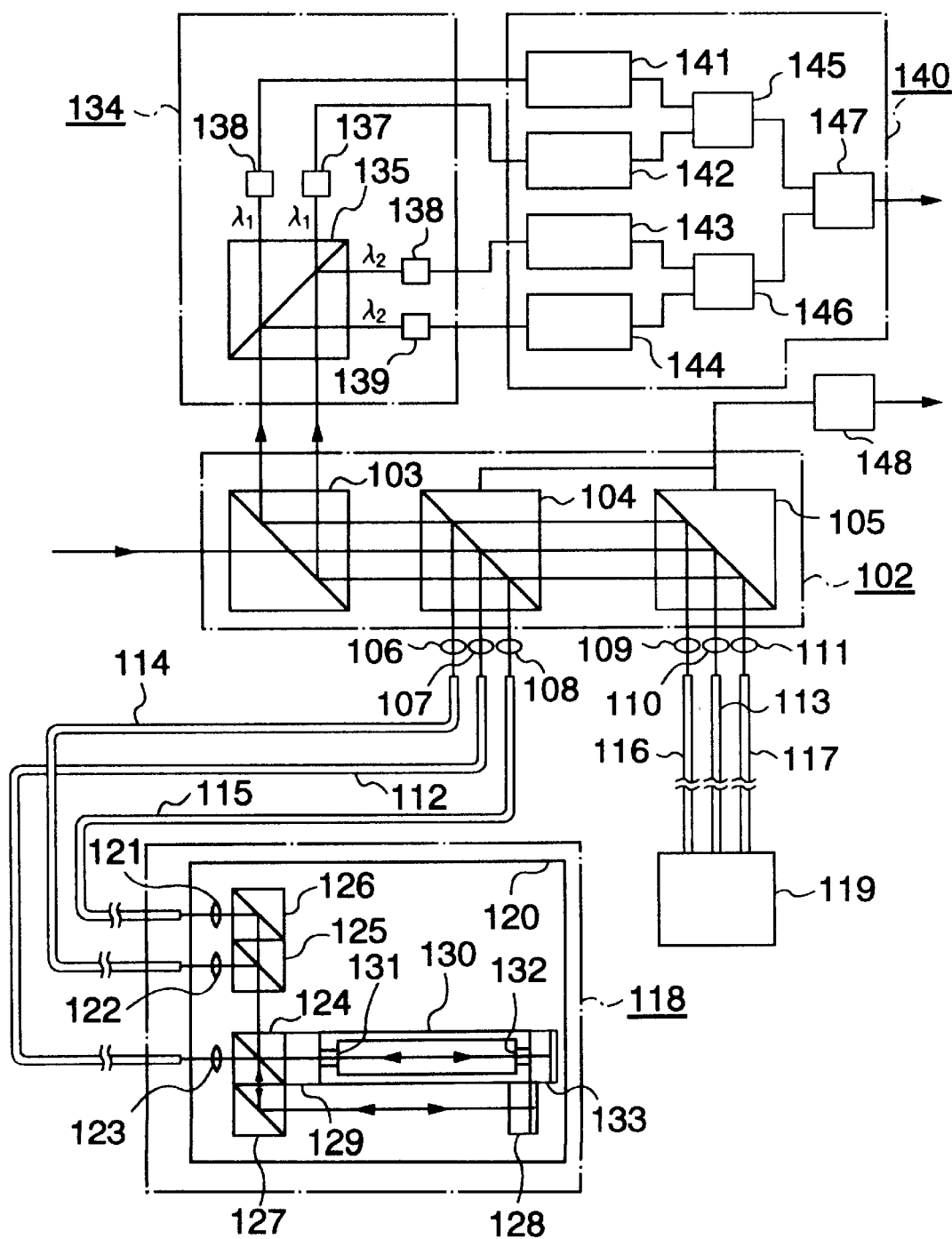
FIG. 9 is a view showing a multipoint-measuring optical pressure sensor system according to a second embodiment of the invention.

FIG. 9 shows another embodiment of the present invention, and this embodiment differs from the first embodiment of FIG. 1 in the constructions of sensing probes, a light distributor, a light-receiving portion and so on. More specifically, in FIG. 9, the light distributor 102 comprises a beam splitter 103 and two active mirrors 104 and 105. These active mirrors 104 and 105 have the same construction as that of the active mirrors of the first embodiment. In this embodiment, reference numerals 106, 107, 108, 109, 110 and 111 denote lenses, respectively, reference numerals 112 and 113 polarization plane-reserving fibers, respectively, and reference numerals 114, 115, 116 and 117 multi-mode fibers, respectively. Reference numerals 118 and 119 denote the sensing probes, respectively, and for example the sensing probe 118 comprises a base 120, lenses 121, 122 and 123, a beam splitter 124, a polarization beam splitter 125, mirrors 126, 127 and 128, a temperature compensation member 129, a hermetically-sealed container 130, transparent windows 131 and 132, and a ¼ wavelength plate 133 with a reflecting film.

In FIG. 9, the light-receiving portion 134 comprises a beam splitter 135 of the wavelength selecting type, a plurality of photodetectors 136, 137, 138 and 139. A signal processing portion 140 comprises a plurality of signal processing circuits 141, 142, 143 and 144, adder circuits 145 and 146, and an arithmetic circuit 147. Reference numeral 148 denotes a switching circuit.

Let's assume that the sensing probe 118 is now selected by the light distributor 102, and this operation will be described. Light, emitted from a light source (not shown), enters the light distributor 102, and is reflected by the active mirror 104, and is condensed into the polarization plane-reserving fiber 112 by the lens 107 (On the other hand, when the sensing probe 119 is selected, the active mirror 104 is in a transmitting mode while the active mirror 105 is in a reflecting mode.). The outgoing light from the polarization plane-reserving fiber 112 is converted into parallel rays of light by the lens 123, and this parallel beam is split by the beam splitter 124 into two beams, that is, a reference beam (transmitted light) and a measurement beam (reflected light). The reference beam passes sequentially through the temperature compensation plate 129, the transparent window 131, the interior of the hermetically-sealed container 130 and the transparent window 132, and is reflected by the ¼ wavelength plate 133 with the reflecting film. The thus reflected reference beam goes back, and again enters the beam splitter 124 to be reflected by it.

On the other hand, the measurement beam is reflected by the mirror 127, and reaches the mirror 128 to be reflected by it. The thus reflected measurement beam goes back, and again enters the beam splitter 124 to be reflected by it. A polarization component of each of the reference beam and the measurement beam (entering the beam splitter 124) perpendicular to the sheet of the drawings is reflected by the polarization beam splitter 125, and is condensed into the fibers 114 by the lens 122. On the other hand, a polarization component parallel to the sheet of the drawings transmits through the polarization beam splitter 125, and is reflected by the mirror 126, and is condensed into the fiber 115 by the lens 121. Then, the outgoing light from the fiber 114 passes sequentially through the lens 106, the active mirror 104 and the beam splitter 103, and then enters the light-receiving portion 134. Similarly, the outgoing light from the fiber 115 passes sequentially through the lens 108, the active mirror 104 and the beam splitter 103, and then enters the light-receiving portion 134.

In the light-receiving portion 134, these light beams are split by the beam splitter 135 of the wavelength selecting type into transmitted light and reflected light in accordance with the wavelength. More specifically, the beam splitter 135 of the wavelength selecting type transmits the light of a wavelength $\lambda_1$ therethrough, but reflects the light of a wavelength $\lambda_2$, thus splitting the light beam into the transmitted light and the reflected light.

The outgoing light from the fiber 114 reaches the photodetector 136 ($\lambda_1$) and 139 ($\lambda_2$) in accordance with the wavelength. On the other hand, the outgoing light from the fiber 115 reaches the photodetector 137 ($\lambda_1$) and 138 ($\lambda_2$) in accordance with the wavelength. For measuring the optical path length difference between the measurement beam and the reference beam using the light of the wavelength $\lambda_1$, outputs of the photodetectors 136 and 137 are inputted to the signal processing circuits 141 and 142, respectively, thereby determining the optical path length difference containing an error due to disturbances applied to the polarization plane-reserving fiber 112, 113, and the outputs of the signal processing circuits 141 and 142 are added together by the addition circuit 145. With the use of the addition circuit 145, an error due to such disturbances can be eliminated, and its principle will hereafter be described. For measuring the optical path length difference between the measurement beam and the reference beam using the light of the wavelength $\lambda_2$, outputs of the photodetectors 138 and 139 are inputted to the signal processing circuits 143 and 144, respectively, thereby determining the optical path length difference containing an error due to disturbances applied to the polarization plane-reserving fiber 112, 113, and the outputs of the signal processing circuits 143 and 144 are added together by the adder circuit 146. A processing for increasing the measurement range by the arithmetic circuit 147, using the results of measurement of the lights of two wavelengths ($\lambda_1$, $\lambda_2$) is the same as described in the first embodiment.

The principle of eliminating the influence of the disturbances by the above-mentioned addition will be described briefly.

The light, condensed into the fiber 114, consists of the component of the measurement beam initially perpendicular to the sheet of the drawings and the component of the reference beam initially parallel to the sheet of the drawings. Therefore, the optical path length difference L between the measurement beam and the reference beam, obtained when the light enters the fiber 114, is expressed by the following formula:

$$L = d_f(n_s - n_p) + \text{(the optical path length difference between the measurement beam and the reference beam developing in the sensing probe)} \quad \text{Formula 27}$$

where $d_f$ represents the length of the polarization plane-reserving fiber.

Similarly, the optical path length difference L, obtained when the light enters the fiber 115, is expressed by the following formula:

$$L = d_f(-n_s - n_p) + \text{(the optical path length difference between the measurement beam and the reference beam developing in the sensing probe)} \quad \text{Formula 28}$$

Therefore, by adding these values together, the error, caused by a change of the refractive index difference of the polarization plane-reserving fiber 112, 113 due to disturbances, can be canceled.

Figure 10:
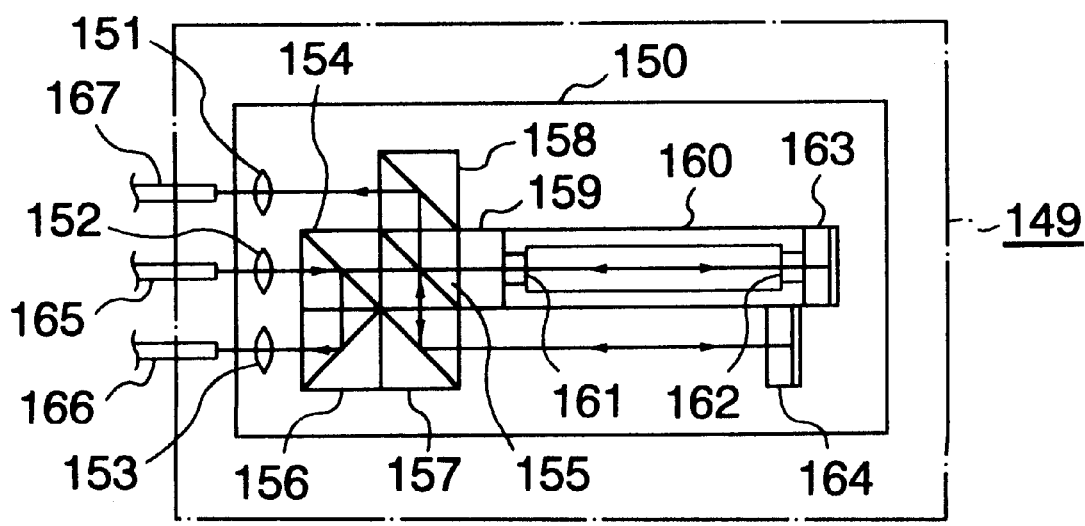
FIG. 10 is a view showing a sensing probe for the multipoint-measuring optical pressure sensor system of FIG. 9.

FIG. 10 is a modified sensing probe used in the optical pressure sensor of the embodiment of FIG. 9. This modified sensing probe 149 comprises a base 150, three lenses 151, 152 and 153, a beam splitter 154, a polarization beam splitter 155, three mirrors 156, 157 and 158, a temperature compensation member 159, a hermetically-sealed container 160, transparent windows 161 and 162, ¼ wavelength plates 163 and 164 each having a reflecting film, a polarization plane-reserving fiber 165, and multi-mode fibers 166 and 167.

In the modified sensing probe of this construction, the outgoing light from the polarization plane-reserving fiber 165 is split into two beams by the beam splitter 154. The reflected light is further reflected by the mirror 156, and is condensed into the multi-mode fiber 166 by the lens 153. A polarization plane of the light condensed into the multi-mode fiber is random, and therefore the light, having the polarization plane perpendicular to the sheet of the drawings, and the light, having the polarization plane parallel to the sheet of the drawings, are mixed together, and interfere with each other. Therefore, (a) "the optical path length difference between the light, having the polarization plane perpendicular to the sheet of the drawings, and the light, having the polarization plane parallel to the sheet of the drawings, which develops during the propagation of the light through the polarization plane-reserving fiber" can be measured from the outgoing light from the multi-mode fiber 166.

The transmitted light through the beam splitter 154 reaches the polarization beam splitter 155. In this beam splitter 155, the polarization component perpendicular to the sheet of the drawings is reflected to form a measurement beam whereas the polarization component parallel to the sheet of the drawings is transmitted through it to form a reference beam. This measurement beam is reflected by the mirror 157, and is further reflected by the ¼ wavelength plate 164 with the reflecting film, and returns to the polarization beam splitter 155 via the mirror 157. At this time, this return measurement beam transmits through the polarization beam splitter 155 since its polarization plane is rotated by 90 degrees when the measurement beam is reflected by the ¼ wavelength plate 163 with the reflecting film.

On the other hand, the reference beam passes through the temperature compensation member 159, the transparent window 161, the interior of the hermetically-sealed container 160 and the transparent window 162, and is reflected by the ¼ wavelength plate 163 with the reflecting film, and is returned to the polarization beam splitter 155 via the transparent window 162, the interior of the hermetically-sealed container 160, the transparent window 161 and the temperature compensation member 159. At this time, this return reference beam is reflected by the polarization beam splitter 155 since its polarization plane is rotated 90 degrees when the reference beam is reflected by the ¼ wavelength plate 163. Therefore, the measurement beam and the reference beam both reach the mirror 158, and are reflected by this mirror, and are condensed into the multi-mode fiber 167 by the lens 151.

In this multi-mode fiber 167, the measurement beam and the reference beam interfere with each other, and therefore (b) "the optical path length difference between the measurement beam and the reference beam, which develops in the sensing probe 149" can be measured from the outgoing light from the multi-mode fiber 167, and the sum of (b) this optical path length difference and (a) "the optical path length difference between the light, having the polarization plane perpendicular to the sheet of the drawings, and the light, having the polarization plane parallel to the sheet of the drawings, which develops during the propagation of the light through the polarization plane-reserving fiber" can be measured.

Therefore, in the signal processing portion 140 of FIG. 9, by subtracting the value of the optical path length difference, measured from the outgoing light from the multi-mode fiber 166, and the value of the optical path length difference measured from the outgoing light from the multi-mode fiber 167, the optical path length, developing in the above sensing probe, can be accurately determined.

Figure 11:
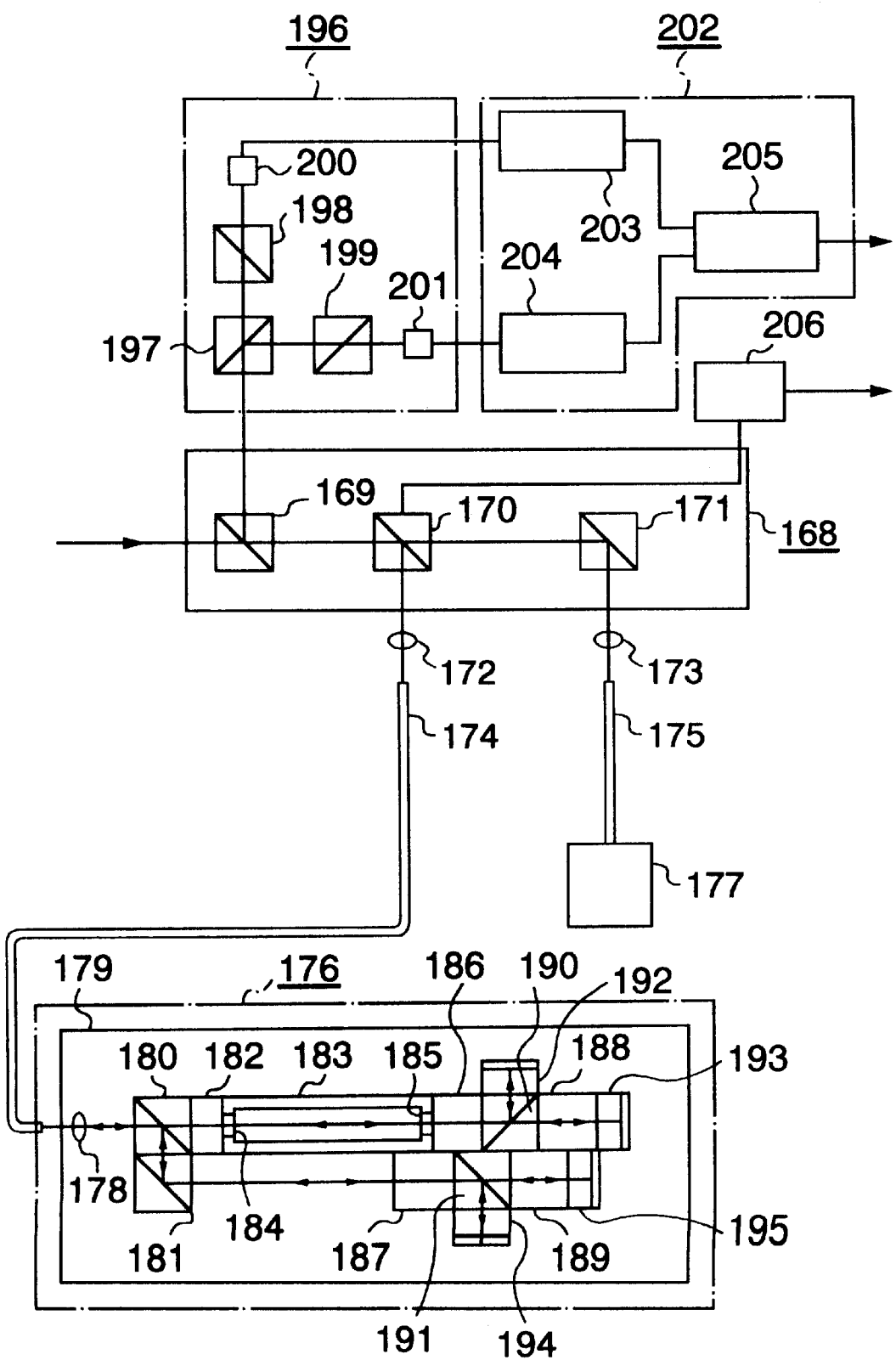
FIG. 11 is a view showing a multipoint-measuring optical pressure sensor system according to a third embodiment of the invention.

FIG. 11 shows a further embodiment of the present invention. In an optical pressure sensor of this embodiment, a light distributor 168 comprises a beam splitter 169, and active mirrors 170 and 171. Reference numerals 172 and 173 denote lenses, reference numerals 174 and 175 polarization plane-reserving fibers, and reference numerals 176 and 177 denote sensing probes. The sensing probe 176 comprises a lens 178, a base 179, a beam splitter 180, a mirror 181, a temperature compensation member 182, a hermetically-sealed container 183, transparent windows 184 and 185, Faraday rotation elements 186, 187, 188 and 189, beam splitters 190 and 191 of the wavelength selecting type, and polarization plates 192, 193, 194 and 195 each having a reflecting film.

Among the constituent parts of the sensing probe 176, the beam splitters 190 and 191 of the wavelength selecting type transmit light of a wavelength $\lambda_1$ therethrough, but reflect light of a wavelength $\lambda_2$. The Faraday rotation elements 186 and 187 rotate a polarization plane of the light of the wavelength $\lambda_1$ by 45 degrees clockwise as viewed in a direction of advance, but generally do not accurately rotate a polarization plane of the light of the wavelength $\lambda_2$ by 45 degrees. The polarization plates 192 and 193 each with the reflecting film transmit a polarization parallel with the surface of the sheet of the drawings and a polarization component rotated 45 degrees clockwise as viewed in the direction of advance of the light when the light is incident from that side remote from the reflecting film. On the other hand, polarization plates 194 and 195 each with the reflecting film transmit a polarization component parallel with the surface of the sheet of the drawings and a polarization component rotated counterclockwise by 45° as viewed in the direction of advance of the light when the light is incident from that side remote from the reflecting film. The Faraday rotation elements 188 and 189 accurately rotate the polarization plane (which has been rotated by 45 degrees by the Faraday rotation element 186, 187) of the light of the wavelength $\lambda_1$ by 45 degrees. Namely, the Faraday rotation elements 186 and 188, as well as the Faraday rotation elements 187 and 189, rotate the polarization plane of the light of the wavelength $\lambda_1$ by 45 degrees clockwise in the direction of advance.

A light-receiving portion 196 comprises a beam splitter 197 of the wavelength selecting type, polarization beam splitters 198 and 199 (which are so arranged that their transmission axes are disposed at 45 degrees with respect to the sheet of the drawings), and photodetectors 200 and 201. A signal processing portion 202 comprises signal processing circuits 202 and 204, and an arithmetic circuit 205, and reference numeral 206 denotes a switching circuit.

In the optical pressure sensor of the above construction, light from the active mirror 170 of the light distributor 168 passes through the lens 172 and the polarization plane-reserving fiber 174, and enters the sensing probe 176, and is split by the beam splitter 180 into a reference beam (transmitted light) and a measurement beam (reflected light). The light of the wavelength $\lambda_1$ in this reference beam passes through the temperature compensation plate 182, the transparent window 184, the interior of the hermetically-sealed container 183, the transparent window 185, the Faraday rotation element 186, the beam splitter 190 of the wavelength selecting type and the Faraday rotation element 188, and reaches the polarization plate 193 with the reflecting film. Here, the light, having the polarization plane disposed at 45 degrees clockwise with respect to the sheet of the drawings, is selected, and therefore in the polarization plane-reserving fiber for propagating the light from the light source to the sensing probe, only the light, having the polarization plane parallel to the sheet of the drawings, is selected. This light is reflected by the reflecting film of the polarization plate 193, and goes back along the optical path of travel of the incoming light, and again reaches the polarization plane-reserving fiber 174. At this time, the polarization plane of this light has been further rotated by 45 degrees by the Faraday rotation element 188 and the Faraday rotation element 186, and is disposed perpendicular to the sheet of the drawings.

The light of the wavelength $\lambda_2$ passes through the temperature compensation member 182, the transparent window 184, the interior of the hermetically-sealed container 183, the transparent window 185, the Faraday rotation element 186 and the beam splitter 190 of the wavelength selecting type to reach the polarization plate 192 with the reflecting film. Here, also, only the light, having the polarization plane disposed at 45 degrees clockwise with respect to the sheet of the drawings, is selected, that is, in the polarization plane-reserving fiber, only the light, having the polarization plane parallel to the sheet of the drawings, is selected. This light is reflected by the reflecting film of the polarization plate 193, and goes back along the optical path of travel of the incoming light to reach the polarization plane-reserving fiber. At this time, the polarization plane of this light is rotated 45 degrees by the Faraday rotation element 188 and the Faraday rotation element 186, and is disposed perpendicular to the sheet of the drawings.

On the other hand, according to the same principle, the light of the wavelength $\lambda_1$ in the measurement beam passes through the optical path including the Faraday rotation element 187, the beam splitter 191 of the wavelength selecting type and the Faraday rotation element 189 to reach the polarization plate 195 with the reflecting film, and goes back along this optical path. Namely, the polarization plate 195 with the reflecting film transmits the polarization component parallel to the sheet of the drawings and the polarization component rotated by 45 degrees counterclockwise with respect to the direction of advance, and therefore in the polarization plane-reserving fiber 174, only the light, having the polarization plane perpendicular to the sheet of the drawings, is selected, and the light again enters the polarization plane-reserving fiber 174. The light of the wavelength $\lambda_2$ also passes through the optical path including the Faraday rotation element 187, the beam splitter 191 of the wavelength selecting type to reach the polarization plate 194 with the reflecting film, and goes back along this optical path. Therefore, in the polarization plane-reserving fiber 174, only the light, having the polarization plane perpendicular to the sheet of the drawings, is selected as is the case with the light of the wavelength $\lambda_1$, and the light again enters the polarization plane-reserving fiber 174.

Thus, regardless of the wavelength of the light, the measurement beam has the polarization plane parallel to the sheet of the drawings in the optical path from the light source to the sensing probe 176, and also has the polarization plane perpendicular to the sheet of the drawings in the optical path from the sensing probe 176 to the light-receiving portion 196. On the other hand, the reference beam has the polarization plane perpendicular to the sheet of the drawings in the optical path from the light source to the sensing probe 176, and also has the polarization plane parallel to the sheet of the drawings in the optical path from the sensing probe 176 to the light-receiving portion 196. Thus, each of the measurement beam and the reference beam propagates through the polarization plane-reserving fiber in such a manner that the light thereof once has the polarization plane perpendicular to the sheet of the drawings, and also once has the polarization plane parallel to the sheet of the drawings. Therefore, even if disturbances are applied to the polarization plane-reserving fiber 174, so that the refractive index $n_s$ for the light having the polarization plane perpendicular to the sheet of the drawings and the refractive index $n_p$ for the light having the polarization plan parallel to the sheet of the drawings are varied, the measurement beam and the reference beam are both subjected to this influence, so that this influence is canceled, and only the optical path length difference due to a change or variation of the atmospheric pressure developing in the sensing probe 176 can be measured in the signal processing portion 202.

Figure 12A:
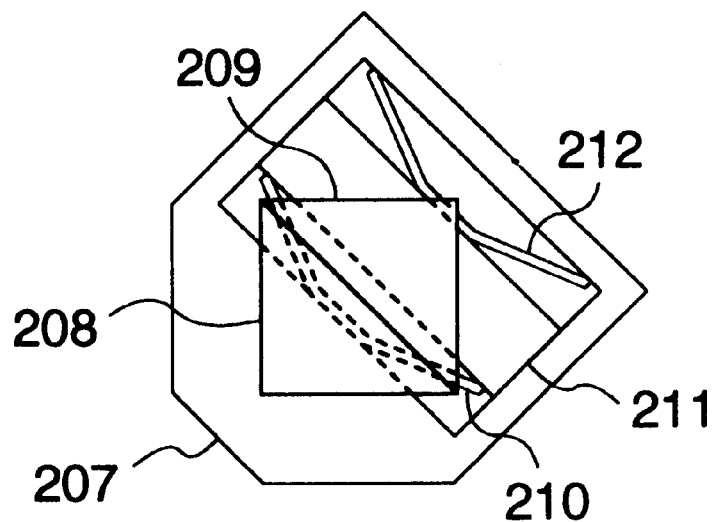
FIG. 12A is a top plan view of a modified active mirror of the multipoint-measuring optical pressure sensor system shown in FIG. 1.
Figure 12B:
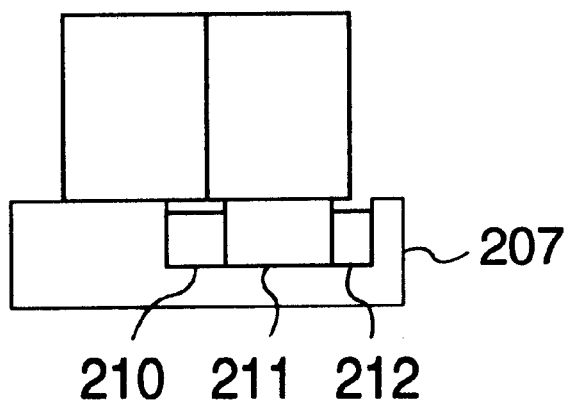
FIG. 12B is a side-elevational view of the active mirror of FIG. 12A.

FIGS. 12A and 12B show a modified form of the active mirror 8 to 11 of the light distributor shown in FIG. 1. FIG. 12A is a top plan view of this modified active mirror, and FIG. 12B is a side-elevational view thereof. In these Figures, reference numeral 207 denotes a base, and reference numerals 208 and 209 denote prisms, respectively, and these parts are held in intimate contact with one another. Reference numeral 210 denotes an optical strain element which produce bending upon reception of light. Reference numeral 211 denotes a moving base, and reference numeral 212 denotes a leaf spring, and the prism 209 is mounted on the moving base 211.

In the modified active mirror of this construction, since the prism 209 is normally held in intimate with the prism 208 under the influence of the leaf spring 212, the incident light transmits through these prisms. However, when light is applied to the optical strain element 210, the prism 209 is moved apart from the prism 208, so that the incident light is reflected. In this modified example, the light distributor can be constituted without the use of electricity, and therefore there can be provided the pressure sensing system highly resistant to electric noises. Instead of the above optical strain element, there can be used an element made of a shape memory alloy, in which case when light is applied to this element to heat the same, the prism is moved.

As described in detail, the present invention provides the optical pressure detection method, the sensor used in this method, the wavelength plate, the polarization selection device and the light distributor used in the optical pressure sensor, the multipoint-measuring optical sensor system utilizing this method, and the sensing probe used in this system, and the invention provides the optical pressure sensor which can be used in a chemical plant or the like without the need for any special explosion-proof construction, can be easily manufactured, can be easily handled, and is highly reliable, and the invention also provides the optical pressure detection method which is highly reliable, and the multipoint-measuring optical pressure sensor system using such a method. The invention further provides the multipoint-measuring optical pressure sensor system which can detect pressures at a plurality of points by one signal processing portion. The optical pressure sensor of the invention has a wide measuring range, and is less liable to be influenced by a change of the ambient temperature, and is less liable to be influence by a variation in the amount of light of the light source and a variation in light loss in the optical path.

What is claimed is:

1. A sensor comprising:

a light source;

a signal processor;

a sensing probe;

a first fiber connecting said light source to said sensor probe; and a second fiber connecting said sensing probe to said signal processor;

wherein said sensing probe comprises a beam splitter which splits light from said light source into two beams respectively defining a measurement beam and a reference beam, a wavelength plate inserted in at least one of optical paths of the reference beam and the measurement beam, a first mirror for reflecting the reference beam, a second mirror for reflecting the measurement beam, a reference optical path member provided in the optical path of the reference beam, and a pressure-sensitive medium which varies in refractive index in accordance with a pressure present in the optical path of the measurement beam;

wherein said first and second fibers are polarization plane-reserving fibers which propagates the light from said light source as two light beams whose polarization planes are different by an angle of 90 degrees from each other; and wherein said signal processor comprises a polarization splitter which splits outgoing light returning from said sensing probe from said polarization plane-reserving fiber in terms of polarization into two beams, signal processing circuits which determine a difference between a length of the optical path of the measurement beam and a length of the optical path of the reference beam from the outgoing light from said polarization splitter, and an adder circuit which adds outputs of said signal processing circuits together, in which there is provided a beam distributor which distributes the beam from said light source to a plurality of portions, and there is provided a switching circuit which feeds the outgoing light returning from said sensing probe from said beam distributor to said signal processing circuits in a time-sharing manner.

2. A sensor according to claim 1, in which said beam distributor comprises a plurality of juxtaposed active mirrors each comprising a pair of transparent members closely spaced from each other, and the spacing between said two transparent members is changed by a space adjuster so that the light beam, applied to said active mirror, can be selectively reflected and transmitted.

3. A multipoint-measuring optical pressure sensor system using an optical pressure detecting method wherein light from a light source is split into at least two light beams respectively defining a reference beam and a measuring beam; said reference beam is passed through a reference medium whereas said measurement beam is passed through a pressure-sensitive medium which varies in refractive index in accordance with a pressure, the difference between a length of an optical path of said reference beam and a length of an optical path of said measurement beam after said reference and measurement beams pass their respective mediums is determined; and the pressure of said pressure-sensitive medium is detected from said optical path length difference, wherein the multipoint-measuring optical pressure sensor system detects the pressure of the pressure-sensitive medium respectively at a plurality of detection portions remote from said light source;

said multipoint-measuring optical pressure sensor system comprising:
light distributing means comprised of a stationary part and a movable part and including a plurality of active mirrors, for distributing the light from said light source among said plurality of detection portions, said light distributing means being adapted to transmit or reflect the light in accordance with a variation in a distance between the stationary part and the movable part;
an optical fiber network for feeding the distributed light beams from said light distributing means respectively to said plurality of detection portions, said plurality of active mirrors being sequentially controlled so as to feed the light from said light source sequentially to said plurality of remote detection portions via said optical fiber network;
sensing probes provided respectively in said plurality of remote detection portions, wherein in each of said sensing probes, the light, fed thereto via said light distributing means and said optical fiber network, is split into at least two beams to thereby provide the reference beam and the measurement beam, and said reference beam is passed through the reference medium while said measurement beam is passed through the pressure-sensitive medium;
a light-receiving portion for receiving said reference beams and measurement beams from said plurality of sensing probes and for detecting the light of said reference and measurement beams passed through their respective mediums; and
a signal processing portion for calculating the pressure of said pressure-sensitive medium at each of said plurality of detection portions in accordance with the optical path length difference between said reference and measurement beams detected at said light-receiving portion.

4. A system according to claim 3, in which said light distributing means comprises a beam splitter for feeding said reference and measurement beams (which have passed through their respective mediums) from each of said sensing probes to said light-receiving portion.

5. A sensor comprising:
a light source;
a signal processor;
a sensing probe;
a first fiber connecting said light source to said sensing probe; and
a second fiber connecting said sensing probe to said signal processor;
wherein said sensing probe comprises a beam splitter which splits light from said light source into two beams respectively defining a measurement beam and a reference beam, a wavelength plate inserted in at least one of optical paths of the reference beam and the measurement beam, a first mirror for reflecting the reference beam, a second mirror for reflecting the measurement beam, a reference optical path member provided in the optical path of the reference beam, and a pressure-sensitive medium which varies in refractive index in accordance with a pressure present in the optical path of the measurement beam, and a polarization splitter which splits the reflected light of each of said measurement beam and said reference beam in terms of polarization into two beams;
wherein said first fiber is a polarization plane-reserving fiber which propagates the light from said light source as two light beams whose polarization planes are different by an angle of 90 degrees from each other;
wherein said second fiber comprises two fibers for respectively feeding two kinds of outgoing beams from said polarization splitter to signal processing circuits which determine a difference between a length of the optical path of the measurement beam and a length of the optical path of the reference beam, and a temperature compensator which compensates said optical path length difference for a variation caused by a temperature change; and
wherein said signal processor comprises an adder circuit which adds outputs of said signal processing circuits together,
in which there is provided a beam distributor which distributes the beam from said light source to a plurality of portions, and there is provided a switching circuit which feeds the outgoing light returning from said sensing probe from said beam distributor to said signal processing circuits in a time-sharing manner.

6. A sensor according to claim 5, in which said beam distributor comprises a plurality of juxtaposed active mirrors each comprising a pair of transparent members closely spaced from each other, and the spacing between said two transparent members is changed by a space adjuster so that the light beam, applied to said active mirror, can be selectively reflected and transmitted.

7. A sensor comprising:
a light source;
a signal processor;
a sensing probe;
a first fiber connecting said light source to said sensing probe; and
a second fiber connecting said sensing probe to said signal processor;
wherein said sensing probe comprises a beam splitter which splits light from said light source into two beams, a polarization beam splitter and combiner which splits the light in terms of polarization into a measurement beam and a reference beam and then combines the beams together, a reference optical member and a ¼ wavelength plate provided in an optical path of said reference beam, and a pressure-sensitive medium which is in an optical path of the measurement beam and which varies in refractive index in accordance with a pressure thereof, and a ¼ wavelength plate also in the optical path of the measurement beam;
wherein said first fiber is a polarization plane-reserving fiber which propagates the light from said light source as two light beams whose polarization planes are different by an angle of 90 degrees from each other;

wherein said second fiber comprises two fibers for respectively feeding an output of said polarization beam splitter and combiner and an output of said beam splitter to signal processing circuits which determine an optical path length difference between the light beams of one polarization and an optical path length difference of the light beams of another polarization; and wherein said signal processor comprises a subtracting circuit which subtracts outputs of said signal processing circuits from each other, in which there is provided a beam distributor which distributes the beam from said light source to a plurality of portions, and there is provided a switching circuit which feeds the outgoing light returning from said sensing probe from said beam distributor to said signal processing circuits in a time-sharing manner.

8. A sensor according to claim 7, in which said beam distributor comprises a plurality of juxtaposed active mirrors each comprising a pair of transparent members closely spaced from each other, and the spacing between said two transparent members is changed by a space adjuster so that the light beam, applied to said active mirror, can be selectively reflected and transmitted.

* * * * *